(12) United States Patent
Simpson et al.

(10) Patent No.: US 9,312,637 B2
(45) Date of Patent: Apr. 12, 2016

(54) COMMUNICATION SYSTEM HAVING A FLOATABLE CONNECTOR ASSEMBLY

(71) Applicant: Tyco Electronics Corporation, Berwyn, PA (US)

(72) Inventors: Jeffrey Stewart Simpson, Mechanicsburg, PA (US); Lee Andrew Barkus, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 420 days.

(21) Appl. No.: 13/905,292

(22) Filed: May 30, 2013

(65) Prior Publication Data
US 2014/0355937 A1 Dec. 4, 2014

(51) Int. Cl.
*G02B 6/36* (2006.01)
*H01R 13/631* (2006.01)
*H01R 12/91* (2011.01)
*H04Q 1/00* (2006.01)
*G02B 6/38* (2006.01)
*H04Q 1/08* (2006.01)
*G02B 6/43* (2006.01)

(52) U.S. Cl.
CPC .......... *H01R 13/6315* (2013.01); *G02B 6/3897* (2013.01); *H01R 12/91* (2013.01); *H04Q 1/00* (2013.01); *H04Q 1/08* (2013.01); *G02B 6/43* (2013.01)

(58) Field of Classification Search
None
See application file for complete search history.

(56) References Cited

U.S. PATENT DOCUMENTS

| 5,898,808 A * | 4/1999 | Morlion et al. ................. 385/77 |
| 2003/0026549 A1* | 2/2003 | Ellis et al. ....................... 385/53 |
| 2005/0135742 A1* | 6/2005 | Basavanhally et al. ......... 385/33 |

* cited by examiner

*Primary Examiner* — Tina Wong

(57) ABSTRACT

Communication system including a support frame having a pair of spacer walls that oppose each other. The spacer walls defines a receiving gap directly therebetween. The communication system also includes a floatable connector assembly including a connector module and a communication cable coupled to the connector module. The connector module is configured to engage a mating module along a central axis to establish a communicative connection. At least a portion of the connector assembly is disposed between the spacer walls within the receiving gap. The communication system also includes a positioning gasket having a plurality of alignment members that directly engage at least one of the connector assembly or the support frame. The alignment members permit the connector assembly to float with respect to the support frame during the mating operation in a direction that is transverse to the central axis.

20 Claims, 6 Drawing Sheets

COMMUNICATION SYSTEM HAVING A FLOATABLE CONNECTOR ASSEMBLY

BACKGROUND OF THE INVENTION

The subject matter herein relates generally to communication systems having one or more connector assemblies configured to establish at least one of an electrical or optical connection.

Connector assemblies, such as those used in networking and telecommunication systems, may utilize connectors (referred to herein as connector modules) to communicatively interconnect components of a communication system, such as a motherboard and daughter card. The communication system may utilize alignment features that facilitate aligning the connector modules as the connector modules engage each other during a mating operation. For example, a first connector module may have inclined surfaces that direct a second connector module into alignment with the first connector module. As another example, the daughter card may have guide features (e.g., guide posts) that are mounted proximate to a leading edge of the daughter card.

In one conventional communication system, a backplane assembly includes multiple electrical connector modules that are held by a support frame. The connector modules are aligned with one another in a series. Each of the connector modules is coupled to at least one communication cable that transmits data signals to and/or from the connector modules. The connector modules of the backplane assembly are configured to mate with connector modules attached to a daughter card. One or both of the backplane assembly and the daughter card may include guide features, such as guide pins and complementary cavities that receive the guide pins.

Tolerances during the manufacturing of the daughter card and/or the backplane assembly, however, may result in inconsistent positioning of the connector modules. In extreme cases, the connector modules may not properly mate with each other despite the guide features. Even if the connector modules are capable of mating, minor misalignments between the connector modules may cause undesired stress on the connector modules when mated.

Accordingly, there is a need for a connector assembly that facilitates aligning a connector module with a mating module during a mating operation.

BRIEF DESCRIPTION OF THE INVENTION

In one embodiment, a communication system is provided that includes a support frame having a pair of spacer walls that oppose each other, wherein the spacer walls define a receiving gap directly therebetween. The communication system also includes a floatable connector assembly including a connector module and a communication cable coupled to the connector module. The connector module is configured to engage a mating module along a central axis to establish a communicative connection. At least a portion of the connector assembly is disposed between the spacer walls within the receiving gap. The communication system also includes a positioning gasket having a plurality of alignment members that directly engage at least one of the connector assembly or the support frame. The alignment members include an elastic material, wherein the alignment members permit the connector assembly to float with respect to the support frame during the mating operation in a direction that is transverse to the central axis.

In certain aspects, each of the alignment members is configured to at least one of stretch, flex, or compress during the mating operation when the mating module and the connector module engage each other in a misaligned manner. In particular embodiments, the alignment members include elastic fins that extend longitudinally parallel to the mating axis or in a direction that is transverse to the mating axis. In particular embodiments, the positioning gasket includes a loop or band that surrounds and grips one of (a) the connector module; (b) the cable; or (c) one of the spacer walls.

In another embodiment, a communication system is provided that includes a support frame having first and second cover plates separated from each other and defining a module spacing therebetween. The communication system also has a connector assembly disposed within the module spacing. The connector assembly includes a connector module and a cable assembly. The connector module has a mating face and a loading end that face in opposite directions along a central axis. The mating face is configured to engage a mating module along the central axis to establish a communicative connection. The cable assembly includes at least one communication cable that projects from the loading end in a direction along the central axis. The communication system also includes a positioning gasket disposed in the module spacing and coupled to and extending along one of the first and second cover plates. The positioning gasket frictionally engages the cable assembly to impede movement of the cable assembly with respect to the support frame.

DETAILED DESCRIPTION OF THE INVENTION

Embodiments described herein include connector assemblies having connector modules that are configured to align with and other connector modules (e.g., mating modules) during a mating operation. Embodiments may include one or more features that allow the connector assembly to re-orient itself (e.g., change orientation) within a support frame that holds the connector assembly. For example, one or more embodiments may include a positioning gasket that permits the connector module to move a limited amount when the connector module and the mating module engage each other in a misaligned manner. In some embodiments, the positioning gasket is secured to the support frame and directly engages the connector assembly. In other embodiments, the positioning gasket is secured to the connector assembly and is configured to directly engage the support frame. Positioning gaskets may include an elastic material that flexes, stretches, and/or compresses when the connector module is pressed against the positioning gasket during the mating operation. Accordingly, the positioning gaskets may permit the connector module to move into a more suitable orientation for mating with the mating module. The positioning gaskets can also apply locating forces to hold the connector assembly in a designated position before the mating operation. In some cases, the positioning gaskets may directly engage one or more cables of the connector assembly to indirectly impede movement of the connector assembly.

Figure 1:
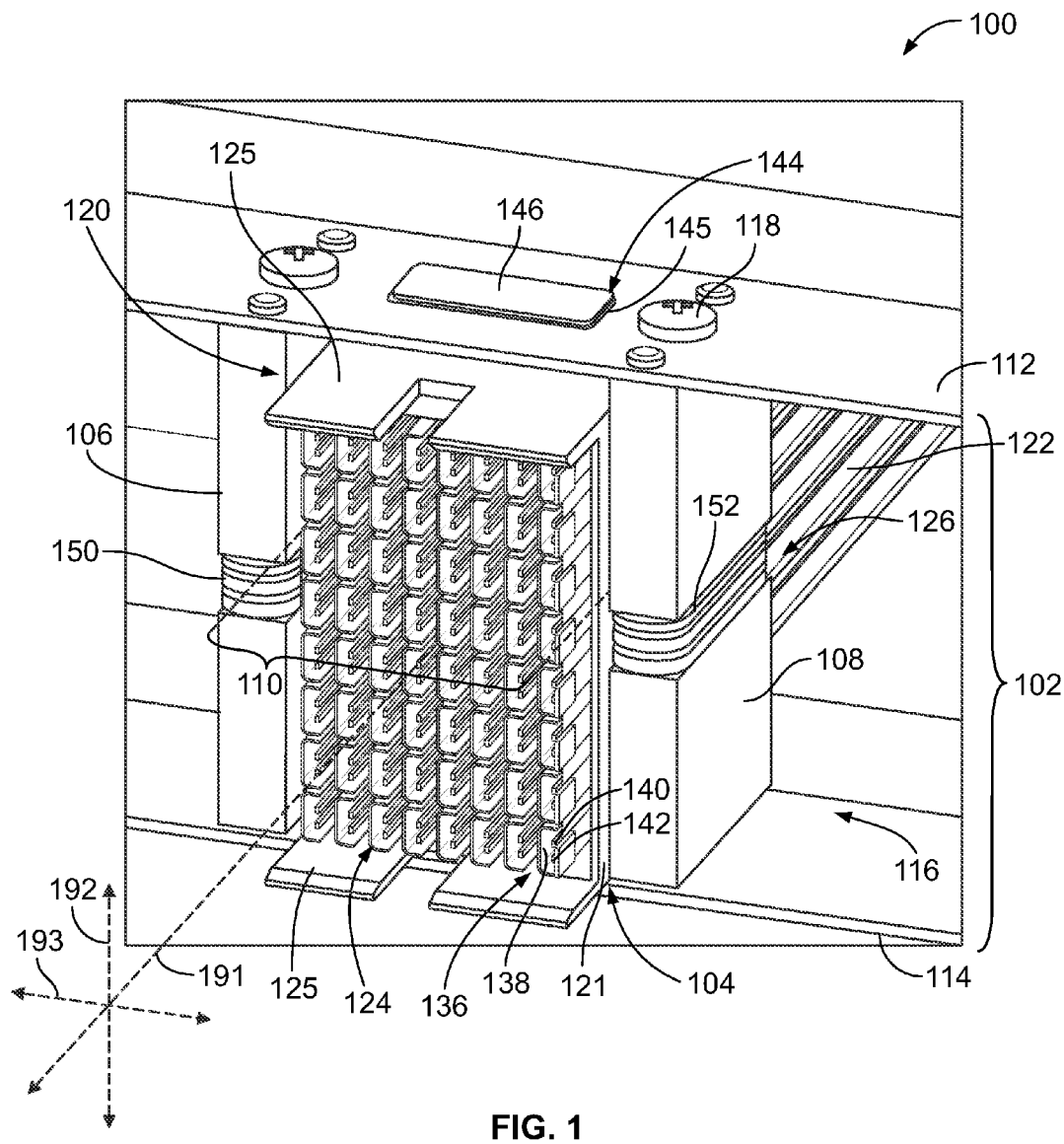
FIG. 1 is a perspective view of a communication system including a connector assembly formed in accordance with one embodiment.

FIG. 1 is a perspective view a communication system 100 formed in accordance with one embodiment. As shown, the communication system 100 is oriented with respect to mutually perpendicular axes 191-193, including a central axis 191 and transverse axes 192, 193. The communication system 100 includes a support frame 102 and a floatable connector assembly 104 that is operably coupled to the support frame 102. For illustrative purposes, only the connector assembly 104 is shown in FIG. 1, but the communication system 100 may include multiple connector assemblies that are held by the support frame 102. The support frame 102 includes interconnected structures that hold the connector assembly 104 in a designated position. For example, the support frame 102 includes cover plates 112, 114 that oppose each other with a module spacing 116 therebetween. The support frame 102 also includes spacer walls 106, 108 that extend across the module spacing 116 and join each of the cover plates 112, 114. The spacer walls 106, 108 oppose each other and define a receiving gap 110 directly therebetween. Optionally, the spacer walls 106, 108 are secured to the cover plates 112, 114 using fasteners 118. The fastener 118 is a screw in the illustrated embodiment, but other fasteners may be used, such as clips, plugs, and the like. In other embodiments, the spacer walls 106, 108 are shaped to form a frictional engagement with the cover plates without the use of a fastener.

The connector assembly 104 includes a connector module (or connector) 120 and one or more communication cables 122 that are coupled to the connector module 120. In the illustrated embodiment, connector assembly 104 includes a plurality of cables 122 that are grouped together, which may be referred to as a cable bundle. Each of the cables 122 may include a ground wire and two signal conductors. However, in other embodiments, the connector assembly 104 may include only one cable that has, for example, only one conductor, a pair of conductors, or numerous conductors.

In the illustrated embodiment, the connector module 120 is an electrical connector module that is configured to engage another electrical connector module (not shown) (hereinafter referred to as "the mating module") to communicate electrical signals therebetween. By way of example only, the connector module 120 may be similar to electrical connectors of the STRADA Whisper or Z-PACK TinMan product lines developed by TE Connectivity. In some embodiments, the connector module 120 is capable of transmitting data signals at high speeds, such as 10 Gbps, 20 Gbps, or more. In certain embodiments, the communication system 100 is a backplane system that is configured to engage one or more daughter cards. However, embodiments are not limited to backplane systems and may be used in other types of communication systems.

In other embodiments, the connector module 120 may be an optical connector module that is configured to engage another optical connector module (or mating module). Optical connector modules may convert electrical signals to optical signals and/or optical signals to electrical signals. In such embodiments, the connector module 120 may include a modulator (not shown) that receives and/or transmits electrical signals. The modulator may encode the electrical signals for optical transmission. The connector module 120 may also include a light source (not shown) that is driven by the modulator to produce optical signals.

The central axis 191 extends substantially through a center of the connector module 120. During a mating operation, the connector module 120 and the mating module are mated with each other along the central axis 191. In an exemplary embodiment, the mating module is advanced toward the connector module 120. However, in other embodiments, the connector module 120 (or the communication system 100) may be moved toward the mating module.

The connector module 120 includes a connector body 121 having a mating face or side 124 and a loading end 126 that face in opposite directions along the central axis 191. The connector body 121 may include various structures for supporting or holding one or more electrical contacts or one or more optical fibers. For example, in certain embodiments, the connector module 120 includes an array of terminal assemblies 136 that are disposed along the mating face 124. In the illustrated embodiment, each of the terminal assemblies 136 includes a ground shield 138 and a pair of electrical contacts 140, 142. In certain embodiments, the electrical contacts 140, 142 are signal contacts that function as a differential pair. As shown, the electrical contacts 140, 142 may be pin contacts. In other embodiments, the electrical contacts may be socket contacts.

The spacer walls 106, 108 may have positioning gaskets 150, 152, respectively, secured thereto. The positioning gaskets 150, 152 are configured to (e.g., sized, shaped, and positioned to) directly engage the connector assembly 104 as described in greater detail below. In the illustrated embodiment, each of the spacer walls 106, 108 has one of the positioning gaskets 150, 152. In other embodiments, only one of the spacer walls 106, 108 may have a positioning gasket or the spacer walls 106, 108 may have more than one positioning gasket.

In the illustrated embodiment, the positioning gaskets 150, 152 are positioned on the spacer walls 106, 108, respectively, about halfway between the cover plates 112, 114. In other embodiments, the positioning gaskets 150, 152 may have different positions. For example, each of the positioning gaskets 150, 152 may be closer to the cover plate 112 or closer to the cover plate 114. As another example, the positioning gasket 150 may be closer to the cover plate 112 and the positioning gasket 152 may be closer to the cover plate 114, or vice-versa.

The connector body 121 may be operably coupled to the support frame 102 such that the connector body 121 is permitted to freely move within a predetermined restricted space. More specifically, the support frame 102 may prevent the connector body 121 from moving beyond the restricted space. For example, as shown in FIG. 1, the cover plate 112 includes a plate opening 144 that is defined by a plate edge 145. The plate opening 144 is configured to receive a projection or extension 146 of the connector body 121. The plate opening 144 and the projection 146 are sized and shaped relative to each other such that the projection 146 is permitted to move freely within the plate opening 144, but confined by the dimensions of the plate edge 145. For example, a length of the plate opening 144 measured along the transverse axis 193 may be greater than a length of the projection 146 such that the connector body 121 is permitted to move laterally within the receiving gap 110. In other words, the plate edge 145 may operate as a positive stop that limits movement of the connector module 120. The connector module 120 may also be permitted to move a limited amount along the transverse axis 192 and along the central axis 191. In alternative embodiments, the connector body 121 may be shaped to have an opening that receives a projection from the cover plate 112. Movement of the connector body 121 may be limited in a similar manner as described above.

Also shown in FIG. 1, the connector body 121 may have engagement features 125 that are configured to engage the mating module during a mating operation. The engagement features 125 facilitate aligning the connector module 120 with respect to the mating module. The engagement features 125 may have a complementary shape with respect to structural features of the mating module. In the illustrated embodiment, the engagement features 125 are projections or walls that project along the central axis 191.

Figure 2:
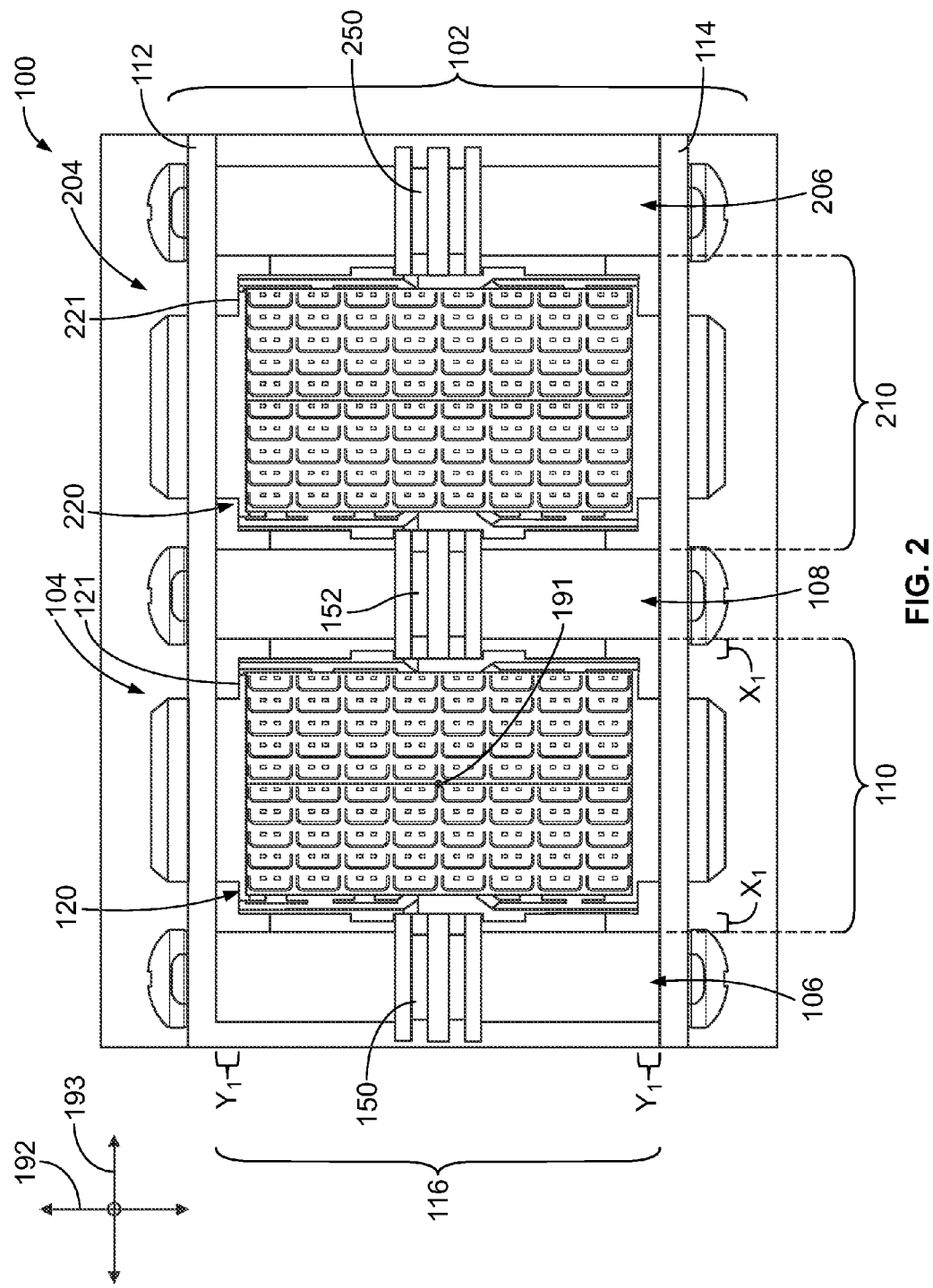
FIG. 2 is a front-end view of the communication system of FIG. 1 showing a pair of adjacent connector assemblies in accordance with one embodiment.

FIG. 2 is a front-end view of the communication system 100 showing a plurality of connector assemblies, which include the connector assembly 104 and a connector assembly 204. As shown, the connector assemblies 104, 204 are held by the support frame 102 within the module spacing 116. In an exemplary embodiment, the connector assemblies 104, 204 are identical, but different connector assemblies may be used in other embodiments. Although only two connector assemblies 104, 204 are shown, the communication system 100 may be configured to hold a series of connector assemblies (e.g., two, three, five, ten, or more). FIG. 2 shows three spacer walls, specifically the spacer walls 106, 108, and a spacer wall 206. Dimensions and locations of the spacer walls 106, 108, and 206 may be predetermined so that the connector assemblies have approximate locations in the communication system 100 for engaging another communication system (not shown), such as a daughter card assembly. Adjacent connector assemblies, such as the connector assemblies 104, 204, may be separated by a common spacer wall 108. Although not shown, the spacer walls 106 and 206 may also be "common" spacer walls that are located between adjacent connector assemblies.

The spacer walls 206, 108 define a receiving gap 210 therebetween where a connector module 220 of the connector assembly 204 is located. The spacer walls 106, 108, and 206 are secured to the cover plates 112, 114. As shown, the spacer walls 106, 108 include the positioning gaskets 150, 152, and the spacer wall 206 includes a positioning gasket 250. The positioning gaskets 150, 152, 206 are configured to directly engage the corresponding connector modules within the receiving gaps 110, 210 and control movement of the corresponding connector assemblies. Specifically, the connector body 121 is engaged by the positioning gaskets 150, 152, and a connector body 221 of the connector module 220 is engaged by the positioning gaskets 152, 250.

FIG. 2 also indicates distances that a connector module may be displaced in directions transverse to the central axis. For example, the connector module 120 may move in either direction along the transverse axis 193 a distance $X_1$ from a predisposed position as shown in FIG. 2. The connector module 120 may also move in either direction along the transverse axis 192 a distance $Y_1$ from the predisposed position. In addition, the connector assembly 104 may be permitted to partially rotate about the central axis 191 when engaged by the mating module. The connector module 220 may be permitted to move in a similar manner as the connector module 120.

Figure 3:
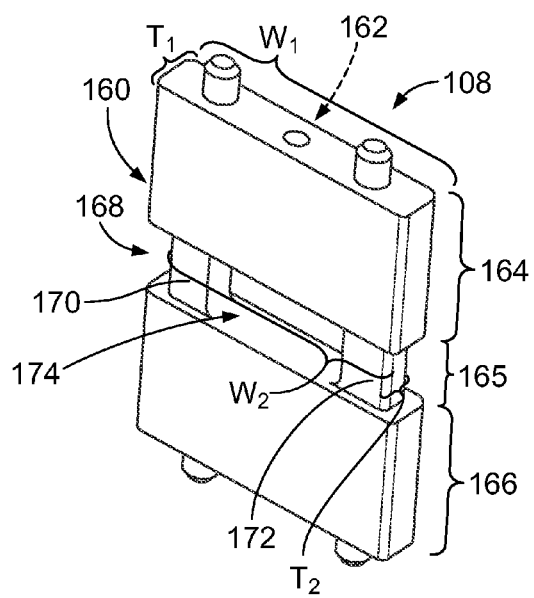
FIG. 3 is an isolated perspective view of a spacer wall that may be used with the communication system of FIG. 1.

FIG. 3 is an isolated perspective view of the spacer wall 108. The spacer wall 108 includes opposite wall sides 160, 162 having a thickness $T_1$ extending therebetween. In the illustrated embodiment, the spacer wall 108 has a plurality of wall portions, including first and second wall portions 164, 166 and an intermediate portion 165 that joins the first and second wall portions 164, 166. The intermediate portion 165 is shaped to include or define a gasket-receiving space 168. As shown, the intermediate portion includes a plurality of joints 170, 172 that extend across the gasket-receiving space 168 to join the first and second wall portions 164, 166.

In the illustrated embodiment, the intermediate portion 165 has reduced dimensions relative to the first and second wall portions 164, 166 such that the gasket-receiving space 168 is formed. For example, the first and second wall portions 164, 166 have the thickness $T_1$ measured along the transverse axis 193 (FIG. 1) and a width $W_1$ measured along the central axis 191 (FIG. 1). The intermediate portion 165 has a thickness $T_2$ and a width $W_2$ that are measured along the transverse axis 193 and the central axis 191, respectively. The thickness $T_2$ is less than the thickness $T_1$, and the width $W_2$ is less than the width $W_1$. The differences in dimensions may be configured so that the positioning gasket 152 (FIG. 1) may be positioned substantially within the gasket-receiving space 168.

Also shown in FIG. 3, a wall opening 174 separates the joints 170, 172. When the positioning gasket 152 is coupled to the spacer wall 108, the positioning gasket 152 extends between the joints 170, 172 and covers the wall opening 174. In some cases, the lack of support due to the wall opening 174 permits the positioning gasket 152 to be depressed into the wall opening 174. In other embodiments, the spacer wall 108 does not include a wall opening. For instance, the intermediate portion 165 may be a continuous (e.g., uninterrupted) piece of material that is similar to the wall portions 164, 166, but with reduced dimensions (e.g., the thickness $T_2$ and the width $W_2$).

Figure 4:
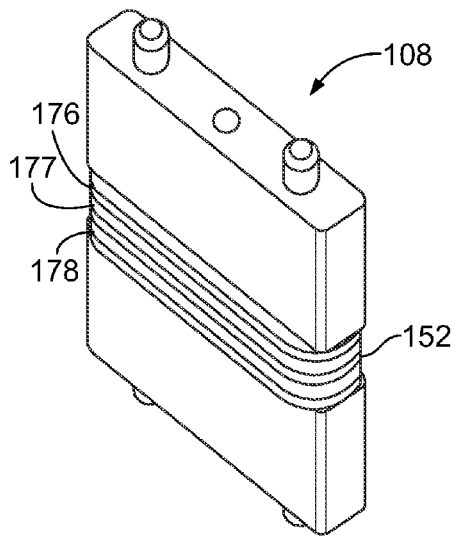
FIG. 4 is a perspective view of the spacer wall having a positioning gasket coupled thereto in accordance with one embodiment.

FIG. 4 is a perspective view of the spacer wall 108 with the positioning gasket 152 attached thereto. When attached to the spacer wall 108 and located in an operative position, the positioning gasket 152 extends longitudinally along the central axis 191 (FIG. 1). In the illustrated embodiment, the positioning gasket 152 is a loop or band that is formed from an elastic material (or elastomer), such as rubber. More specifically, the positioning gasket 152 may be a single piece of material that is similar to an O-ring, rubber band, and the like.

In an exemplary embodiment, the positioning gasket 152 includes a plurality of alignment members 176-178. The alignment members 176-178 may be elastic fins in which the longitudinal dimension of the fins extends along the central axis 191. The alignment members 176-178 are spaced apart from each other and dimensioned such that the alignment members 176-178 are permitted to at least one of flex, compress, or stretch when the connector module 120 is moved into and presses against the positioning gasket 152.

Figure 5:
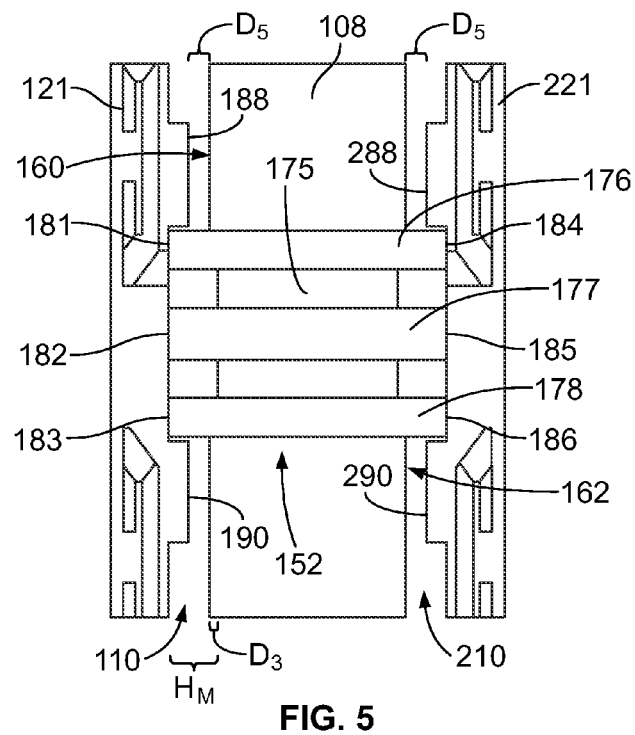
FIG. 5 is an enlarged front-end view of the communication system illustrating the positioning gasket between the adjacent connector assemblies.

FIG. 5 is an enlarged view of the spacer wall 108 located between the connector bodies 121, 221 and illustrates the alignment members 176-178 in greater detail. As shown, the connector body 121 includes wall features 188, 190 and the connector body 221 includes wall features 288, 290. The wall features 188, 190, 288, 290 are configured to engage the positioning gasket 152 to control movement of the corresponding connector bodies. For example, the wall feature 188 is configured to directly engage the alignment member 176. If the connector body 121 is moved downward (as viewed in FIG. 5), the alignment member 176 blocks the wall feature 188. Depending upon the force of the downward movement, the alignment member 176 may permit at least some movement of the connector body 121 in the downward direction.

Each of the alignment members 176-178 may extend continuously around the spacer wall 108 such that each of the alignment members 176-178 engages both of the connector bodies 121, 221. In alternative embodiments, however, the positioning gasket 152 may be configured such that a plurality of alignment members engage only the connector body 121 and a different plurality of alignment members engage only the connector body 221.

The positioning gasket 152 includes a gasket base 175 that directly surrounds and engages (e.g., grips) the joints 170, 172 (FIG. 3). The alignment members 176-178 may project outwardly from the gasket base 175 into the receiving gaps 110, 210. Each of the alignment members 176-178 may extend a common height $H_M$ from the gasket base 175. In certain embodiments, the gasket base 175 does not clear the wall sides 160, 162. For example, as shown in FIG. 5, the gasket base 175 is located a base depth $D_B$ from the wall side 160 and the same base depth $D_B$ from the wall side 162. As such, the alignment members 176-178 project from within the gasket-receiving space 168 (FIG. 3) and clear the wall sides 160, 162.

The wall sides 160, 162 are located a separation distance $D_S$ from the connector bodies 121, 221, respectively. Accordingly, in the illustrated embodiment, the distance between the gasket base 175 and the connector bodies is greater than the distance between the wall sides 160, 162 and the connector bodies. In such embodiments, the alignment members 176-178 may be easier to flex or bend than alignment members with shorter heights. Nonetheless, other embodiments may have alignment members with shorter heights.

As described above, the alignment members 176, 178 engage the wall features 188, 190, respectively. In addition, the alignment members 176-178 engage the surface between the wall features 188, 190 at contact areas 181-183, respectively. Likewise, the alignment members 176, 178 engage the wall features 288, 290, respectively, and the alignment members 176-178 engage the surface between the wall features 288, 290 at contact areas 184-186, respectively. The contact areas 181-186 are areas in which a corresponding alignment member may frictionally engage a corresponding connector body. In an exemplary embodiment, the contact areas 181-186 are elongated and extend parallel to the central axis 191 (FIG. 1).

Accordingly, the positioning gasket 152 is configured to engage each of the connector bodies 121, 221 at multiple locations. When the connector bodies 121, 221 are moved within the receiving gaps 110, 210, respectively, the frictional forces generated at the multiple locations of contact may allow, but limit, movement of the connector bodies 121, 221. As such, the connector bodies 121, 221 and respective connector modules 120, 220 (FIG. 2) are permitted to move independently relative to each other to a suitable orientation within the corresponding receiving gap.

By way of one example, due to tolerances in the manufacture of a daughter card assembly that has a plurality of mating modules and a communication system that engages the daughter card assembly, one or more of the connector modules of the communication system may be misaligned with a corresponding mating module. However, the amount of misalignment may be different. For instance, it may be necessary for the connector module 120 to move upward (as viewed from FIG. 2) and the connector module 220 to move laterally toward the spacer wall 108. Although the positioning gasket 152 engages each of the connector bodies 121, 221, the positioning gasket 152 allows each of the connector modules 120, 220 to move independently to a suitable position.

In addition to permitting a connector body to adjust in orientation, the positioning gasket may hold a corresponding connector body within a designated position. For example, returning to FIG. 2, the positioning gaskets 150, 152 hold the connector body 121 in a designated position prior to the mating operation. The designated position may be a centered position within the receiving gap 110.

Figures 6, 7:
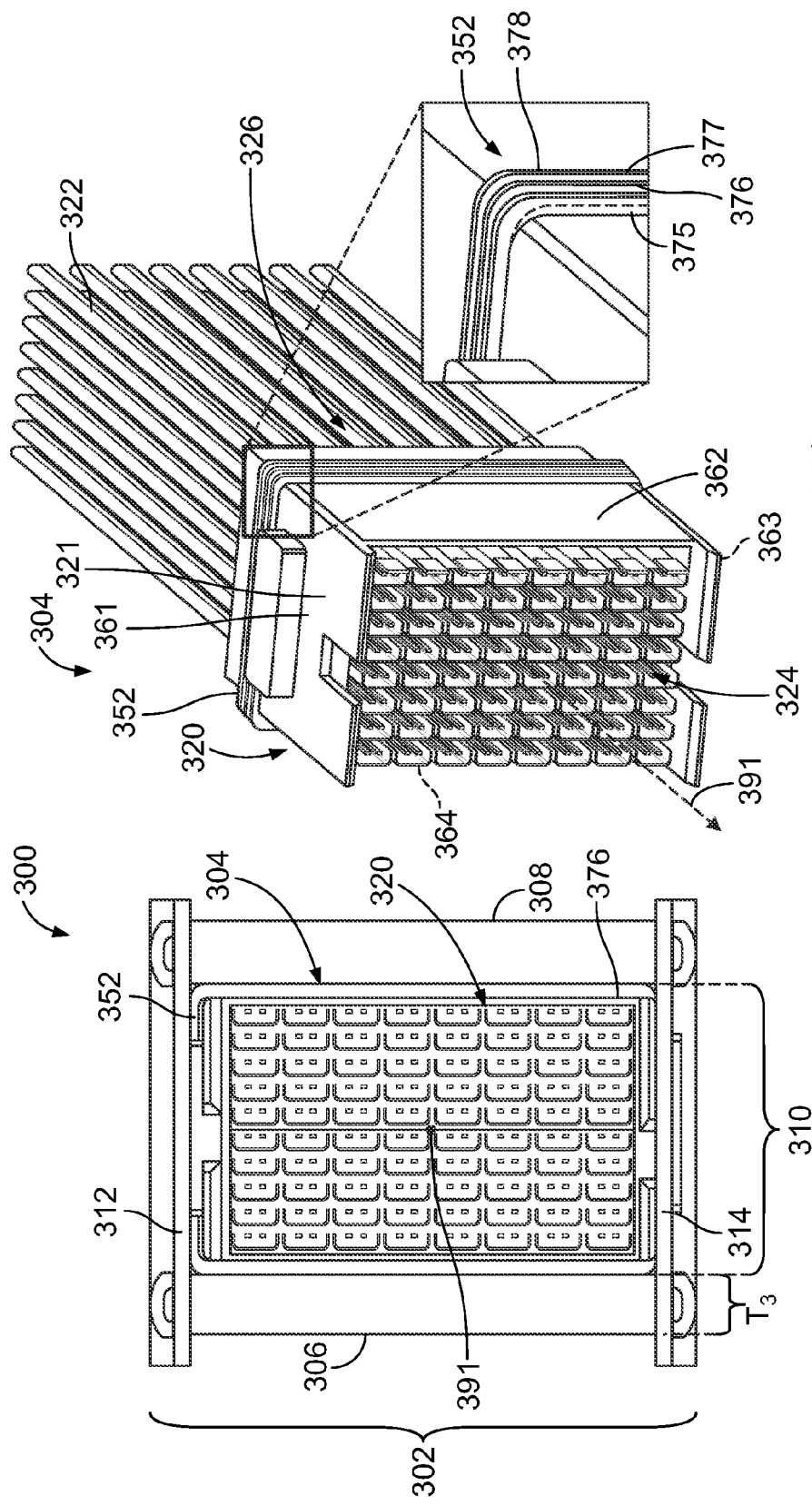
FIG. 6 is a front-end view of a communication system including a connector assembly formed in accordance with one embodiment.
FIG. 7 is a perspective view of the connector assembly that may be used with the communication system of FIG. 6.

FIG. 6 is a front-end view of a communication system 300 formed in accordance with one embodiment. The communication system 300 may have similar components as the communication system 100 (FIG. 1). For example, the communication system 300 may include a floatable connector assembly 304 that includes a connector module 320 and a communication cable 322 (shown in FIG. 7) coupled to the connector module 320. The connector module 320 is configured to engage a mating module (not shown) along a central axis 391 to establish a communicative connection. As shown in FIG. 6, a positioning gasket 352 extends along a perimeter of the connector module 320. In particular embodiments, the positioning gasket 352 encircles the connector module 320.

The communication system 300 also includes a support frame 302. The support frame 302 includes opposing cover plates 312, 314 and opposing spacer walls 306, 308 that extend between and are secured to the cover plates 312, 314. In the illustrated embodiment, the spacer walls 306, 308 have a uniform thickness $T_3$, but may have other dimensions in other embodiments. The cover plates 312, 314 and the spacer walls 306, 308 define a receiving gap 310 therebetween where the connector module 320 is located. Although only one connector assembly 304 is shown, the communication system 300 may include additional connector assemblies.

FIG. 7 is an isolated perspective view of the connector assembly 304 and the positioning gasket 352 coupled thereto. As shown, the connector module 320 has a connector body 321 that includes a mating face or side 324 and a loading end 326 that face in opposite directions along the central axis 391. The connector body 321 also includes connector sides 361-364 that extend between the mating face 324 and the loading end 326. The connector sides 361-364 include opposite plate sides 361, 363 and opposite lateral sides 362, 364.

The positioning gasket 352 is secured to the connector module 320 such that the positioning gasket 352 moves with the connector module 320 when the connector module 320 is moved. The positioning gasket 352 extends around a perimeter of the connector body 321 that is defined by the connector sides 361-364. Like the positioning gasket 152 (FIG. 1), the positioning gasket 352 comprises an elastic material. As shown in the enlarged portion in FIG. 7, the positioning gasket 352 includes a plurality of alignment members 376-378. The alignment members 376-378 are configured to engage the support frame 302 (FIG. 6) and permit the connector assembly 304 to float with respect to the support frame 302 during a mating operation. The connector assembly 304 may be permitted to float in a direction that is transverse to the central axis 391.

The positioning gasket 352 may have a similar configuration as the positioning gasket 152. For example, the positioning gasket 352 includes a gasket base 375 that directly engages the connector body 321. The gasket base 375 may extend continuously around the connector body 321. Each of the alignment members 376-378 projects radially away from the connector body 321, and each of the alignment members 376-378 is configured to directly engage at least one of the spacer walls or at least one of the cover plates. For example, returning to FIG. 6, the alignment member 376 may engage at least one of the spacer wall 308, the cover plate 314, the spacer wall 306, and the cover plate 312. Although not shown in FIG. 6, the alignment members 377 and 378 may also engage at least one of the spacer wall 308, the cover plate 314, the spacer wall 306, and the cover plate 312. The alignment members 376-378 are permitted to at least one of flex, compress, or stretch when the connector module 320 is moved by the mating module and the alignment members 376-378 engage at least a portion of the support frame 302.

Figure 8:
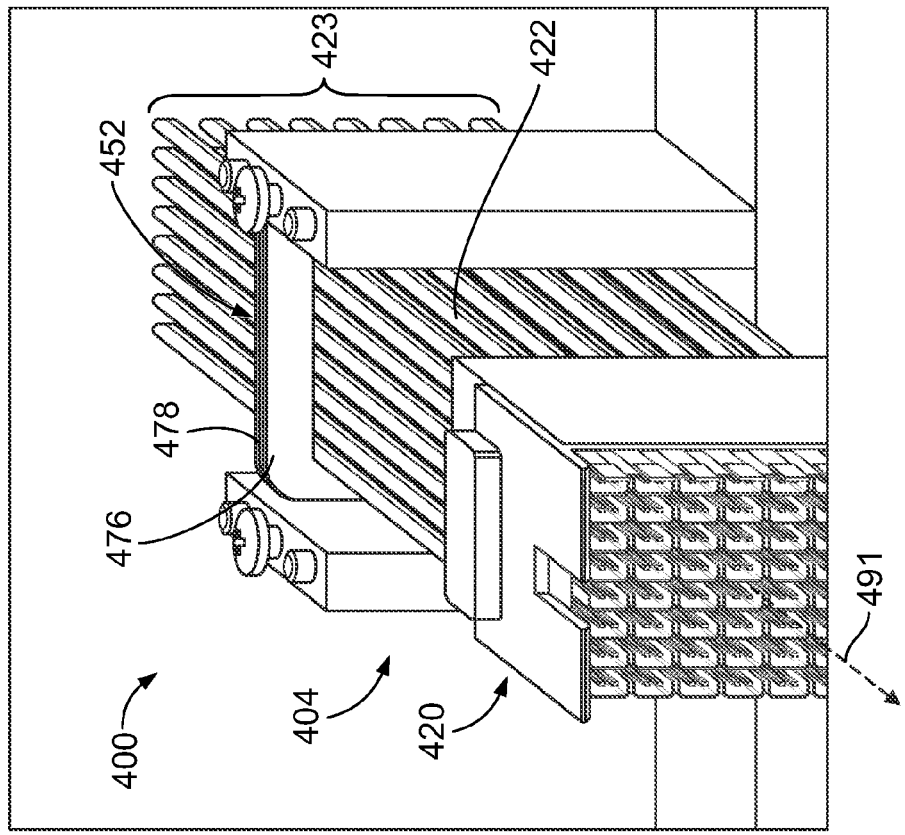
FIG. 8 is an exposed perspective view of a communication system formed in accordance with one embodiment.

FIG. 8 is an exposed perspective view of a communication system 400 in accordance with one embodiment. The communication system 400 may have similar components as the communication system 100 (FIG. 1) and the communication system 300 (FIG. 6). For example, the communication system 400 may include a connector assembly 404 that includes a connector module 420 and at least one communication cable 422 that is coupled to the connector module 420. The connector module 420 is configured to engage a mating module (not shown) along a central axis 491 to establish a communicative connection. In the illustrated embodiment, a plurality of communication cables 422 are coupled to the connector module 420 such that the communication cables 422 form a cable bundle 423. Also shown, the communication system 400 may include a positioning gasket 452 that surrounds and grips the cable bundle 423. The positioning gasket 452 extends around a periphery of the cable bundle 423. The positioning gasket 452 may include a plurality of alignment members 476, 478.

Figure 9:
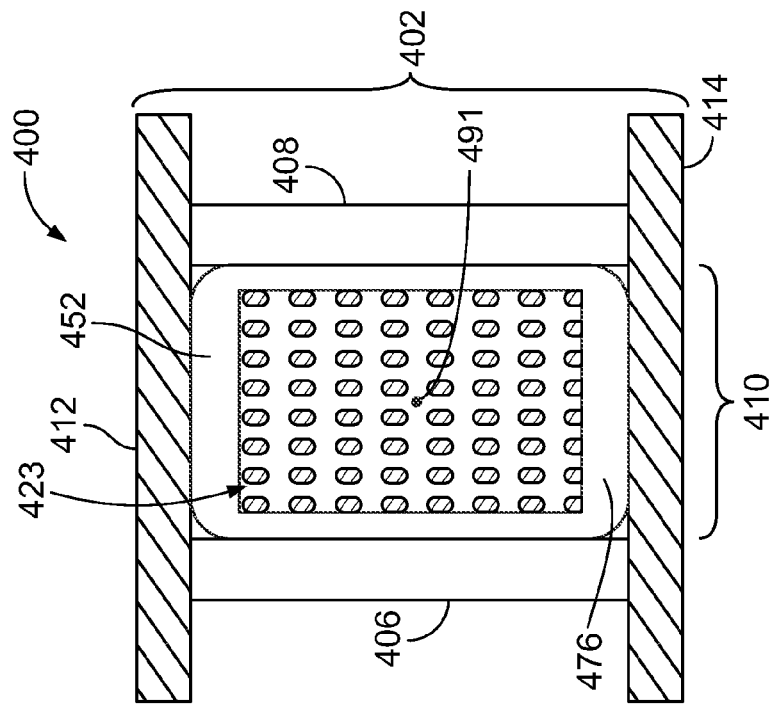
FIG. 9 is a cross-section of the communication system of FIG. 8 showing a positioning gasket in accordance with one embodiment.

FIG. 9 is a cross-section of the communication system 400 viewed along the central axis 491. Like the communication system 100 (FIG. 1) and the communication system 300 (FIG. 6), the communication system 400 also includes a support frame 402 having spacer walls 406, 408 and opposing cover plates 412, 414. The spacer walls 406, 408 and the cover plates 412, 414 define a receiving gap 410 located therebetween.

During a mating operation, the connector module 420 (FIG. 8) may engage a mating module (not shown) causing the connector assembly 404 (FIG. 8), including the cable bundle 423, to move with respect to the support frame 402. Movement of the cable bundle 423 may be limited by the support frame 402. Like other positioning gaskets described herein, the positioning gasket 452 may engage the support frame 402 at multiple locations. For example, the positioning gasket 452 may engage either of the cover plates 412, 414 or either of the spacer walls 406, 408. The alignment member 476 and the alignment member 478 (FIG. 8) are permitted to at least one of flex, compress, or stretch when the connector module 420 is moved by the mating module and the alignment members 476, 478 engage at least a portion of the support frame 402.

Although not shown in FIG. 8 or 9, the connector module 420 (FIG. 8) may be located in a receiving gap that is defined by opposing spacer walls. This configuration may be similar to the communication systems 100 and 300. The spacer walls may or may not have positioning gaskets as set forth herein.

Figure 10:
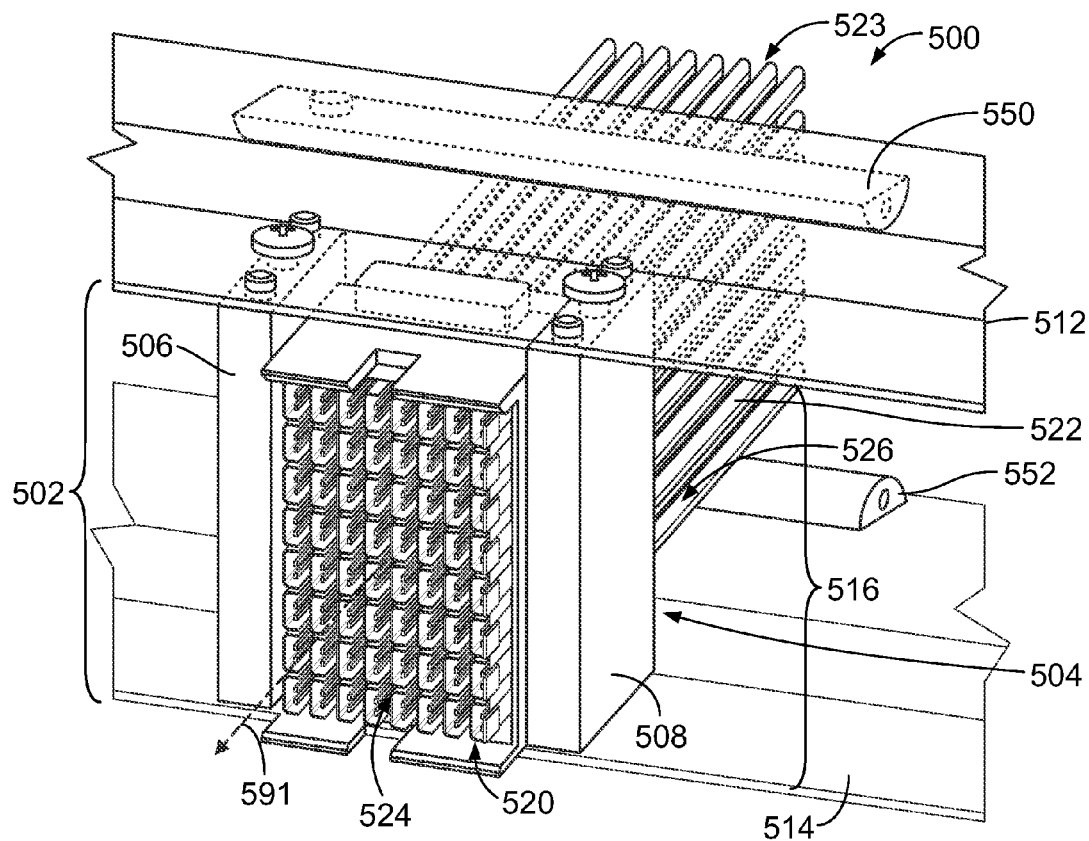
FIG. 10 is a perspective view of a communication system formed in accordance with one embodiment.

FIG. 10 is a perspective view of a communication system 500 formed in accordance with one embodiment. Like the other communication systems described herein, the communication system 500 includes a support frame 502 and a connector assembly 504 that is operably coupled to the support frame 502. The support frame 502 includes opposing cover plates 512, 514 and opposing spacer walls 506, 508. For illustrative purposes, the cover plate 512 is shown in phantom. A module spacing 516 is defined between the cover plates 512, 514.

The connector assembly 504 is disposed within the module spacing 516 and includes a connector module 520 and a cable assembly 523. The cable assembly 523 includes a plurality of communication cables 522 that are grouped together in a bundle. As such, the cable assembly 523 may be referred as a cable bundle. The connector module 520 has a mating face 524 and a loading end 526 that face in opposite directions along a central axis 591. The cable assembly 523 projects from the loading end 526 in a direction along the central axis 591.

In the illustrated embodiment, the spacer walls 506, 508 do not have positioning gaskets. However, in other embodiments, the spacer walls 506, 508 may have positioning gaskets that are similar to the positioning gaskets 150, 152 (FIG. 1). Alternatively, the connector module 520 may have a positioning gasket similar to the positioning gasket 352 (FIG. 6).

As shown in FIG. 10, the communication system 500 also includes first and second positioning gaskets 550, 552 disposed in the module spacing 516. The positioning gaskets 550, 552 are coupled to and extend along the cover plates 512, 514, respectively. Each of the positioning gaskets 550, 552 is configured to frictionally engage the cable assembly 523 to impede movement of the cable assembly 523 with respect to the support frame 502.

Figure 11:
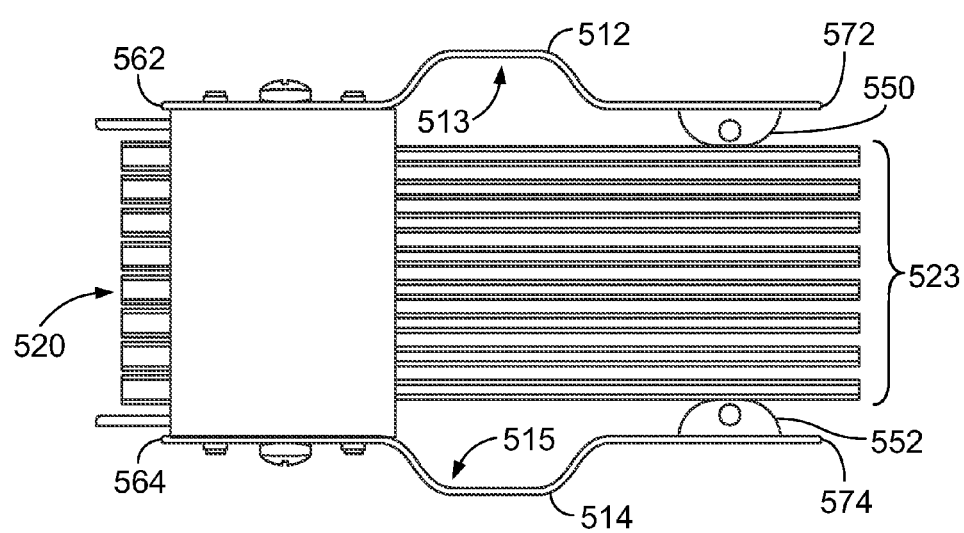
FIG. 11 is a side view of the communication system of FIG. 10 and shows a pair of positioning gaskets engaging a cable bundle.

FIG. 11 is a side view of the communication system 500. The cover plates 512, 514 include leading edges 562, 564, respectively, and trailing edges 572, 574, respectively. The connector module 520 is located along the leading edges 562, 564. The cover plate 512 includes a plate surface 513, and the cover plate 514 includes a plate surface 515 that opposes the plate surface 513. As shown, the positioning gaskets 550, 552 are coupled to and extend along the plate surfaces 513, 515, respectively, proximate to the trailing edges 572, 574, respectively. In certain embodiments, the positioning gaskets 550, 552 directly oppose each other with the cable assembly 523 therebetween. In other embodiments, the positioning gaskets 550, 552 do not directly oppose each other.

The positioning gaskets 550, 552 may be elastomers that are capable of being compressed. Each of the positioning gaskets 550, 552 is configured to frictionally engage the cable assembly 523. The frictional forces generated between the positioning gaskets 550, 552 and the cable assembly 523 may impede movement of the cable assembly 523 with respect to the support frame 502. During a mating operation, the connector module 520 may engage and be displaced by a mating module (not shown). In some embodiments, the frictional forces generated between the positioning gaskets 550, 552 and the cable assembly 523 may resist movement of the connector module 520.

Although FIGS. 1-11 illustrate particular configurations of different communication systems, it is understood that the various features of the communication systems may be combined with features of other communication systems. For example, each of the communication systems 100 and 300 may also include a positioning gasket that surrounds and grips a cable bundle similar to the positioning gasket 452 shown in FIG. 8. Likewise, each of the communication systems 100 and 300 may also include positioning gaskets, similar to the positioning gaskets 550, 552 shown in FIG. 10, that engage the cable bundle to impede movement of the cable bundle and/or to indirectly impede movement of the corresponding connector module through the cable bundle.

As used herein, an element or step recited in the singular and proceeded with the word "a" or "an" should be understood as not excluding plural of said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A communication system comprising:
a support frame comprising a pair of spacer walls that oppose each other, the spacer walls defining a receiving gap directly therebetween;
a floatable connector assembly comprising a connector module and a communication cable coupled to the connector module, the connector module configured to engage a mating module along a central axis to establish a communicative connection, at least a portion of the connector assembly being disposed between the spacer walls within the receiving gap; and
a positioning gasket comprising a plurality of alignment members that directly engage at least one of the connector assembly or the support frame during a mating operation, the alignment members being disposed in the receiving gap and comprising an elastic material, wherein the alignment members permit the connector assembly to float with respect to the support frame during the mating operation in a direction that is transverse to the central axis.

2. The communication system of claim 1, wherein the alignment members comprise elastic fins that extend longitudinally parallel to the mating axis or in a direction that is transverse to the mating axis.

3. The communication system of claim 1, wherein the positioning gasket is a single continuous piece of material such that the alignment members are integrally formed.

4. The communication system of claim 1, wherein the alignment members permit the connector module to partially rotate about the corresponding central axis.

5. The communication system of claim 1, wherein at least two of the positioning gaskets extend into the receiving gap and are positioned on opposite sides of the connector assembly.

6. The communication system of claim 1, wherein at least one of the spacer walls includes first and second wall portions and a gasket-receiving space therebetween, the positioning gasket coupled to the at least one spacer wall and located in the gasket-receiving space.

7. The communication system of claim 1, wherein the connector module is operably coupled to the support frame, the support frame preventing the connector module from moving beyond a restricted space.

8. The communication system of claim 1, wherein the alignment members are secured to the connector assembly ad wherein the positioning gasket extends around the central axis.

9. The communication system of claim 1, wherein the connector module includes an array of terminal assemblies disposed along a mating face of the connector module, the terminal assemblies including a ground shield and a pair of signal contacts.

10. The communication system of claim 1, wherein the support frame includes first and second cover plates that are separated from each other and define a module spacing therebetween, the spacer walls extending between and being secured to each of the first and second cover plates.

11. The communication system of claim 1, wherein the communication system includes two of the floatable connector assemblies, wherein one of the spacer walls is positioned between the two floatable connector assemblies, the positioning gasket being coupled to the one spacer wall and configured to engage the connector module of each of the floatable connector assemblies on respective sides of the one spacer wall.

12. The communication system of claim 1, wherein the alignment members are at least one of (a) secured to the support frame such that the alignment members extend into the receiving gap and directly engage the connector assembly during the mating operation or (b) secured to the connector assembly such that the alignment members are disposed in the receiving gap and directly engage the support frame during the mating operation.

13. A communication system comprising:
a support frame comprising a pair of spacer walls that oppose each other, the spacer walls defining a receiving gap directly therebetween;
a floatable connector assembly comprising a connector module and a communication cable coupled to the connector module, the connector module configured to engage a mating module along a central axis to establish a communicative connection, at least a portion of the connector assembly being disposed between the spacer walls within the receiving gap; and
a positioning gasket comprising a plurality of alignment members that directly engage at least one of the connector assembly or the support frame during a mating operation, the alignment members comprising an elastic material, wherein the alignment members permit the connector assembly to float with respect to the support frame during the mating operation in a direction that is transverse to the central axis;

wherein the positioning gasket comprises a loop or band that surrounds and grips one of (a) the connector module; (b) the cable; or (c) one of the spacer walls.

14. The communication system of claim 13, wherein the communication cable comprises a bundle of cables, the positioning gasket surrounding and gripping the bundle.

15. The communication system of claim 13, wherein the positioning gasket surrounds and grips the connector module.

16. The communication system of claim 13, wherein the positioning gasket surrounds and grips one of the spacer walls.

17. A communication system comprising:
a support frame comprising first and second cover plates separated from each other and defining a module spacing therebetween;
a connector assembly disposed within the module spacing, the connector assembly comprising a connector module and a cable assembly, the connector module having a mating face and a loading end that face in opposite directions along a central axis, the mating face configured to engage a mating module along the central axis to establish a communicative connection, the cable assembly including at least one communication cable that projects from the loading end in a direction along the central axis; and
a positioning gasket disposed in the module spacing and coupled to and extending along one of the first and second cover plates, wherein the positioning gasket frictionally engages the cable assembly to impede movement of the cable assembly with respect to the support frame.

18. The communication system of claim 17, wherein the positioning gasket extends longitudinally in a direction that is transverse to the central axis.

19. The communication system of claim 17, wherein the positioning gasket is a first positioning gasket that is coupled to the first cover plate, the communication system further comprising a second positioning gasket coupled to the second cover plate and disposed in the module spacing, each of the first and second positioning gaskets configured to engage the cable assembly.

20. The communication system of claim 17, wherein the cable assembly is a bundle of communication cables.

* * * * *